(12) United States Patent
Liu et al.

(10) Patent No.: US 9,134,586 B2
(45) Date of Patent: Sep. 15, 2015

(54) PIGMENT-BASED INK

(75) Inventors: Qin Liu, Corvallis, OR (US);
Zhang-Lin Zhou, Palo Alto, CA (US);
Tim R Koch, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 12/897,982

(22) Filed: Oct. 5, 2010

(65) Prior Publication Data

US 2012/0081778 A1 Apr. 5, 2012

(51) Int. Cl.
| | |
|---|---|
| G02B 26/00 | (2006.01) |
| G02F 1/167 | (2006.01) |
| C09D 11/033 | (2014.01) |
| C09D 11/037 | (2014.01) |
| C09D 11/00 | (2014.01) |
| C08G 73/10 | (2006.01) |

(52) U.S. Cl.
CPC ............. *G02F 1/167* (2013.01); *C09D 11/033* (2013.01); *C09D 11/037* (2013.01); *G02F 2001/1676* (2013.01); *G02F 2001/1678* (2013.01); *G02F 2203/34* (2013.01)

(58) Field of Classification Search
USPC ............. 359/296, 290, 294; 345/107; 430/32, 430/25, 28, 281.1, 286.1; 204/600; 106/31.65, 31.75, 31.85, 31.88, 31.9; 523/200; 524/847, 849
See application file for complete search history.

(56) References Cited

U.S. PATENT DOCUMENTS

| | | | |
|---|---|---|---|
| 5,846,310 A | 12/1998 | Noguchi | |
| 6,277,183 B1 | 8/2001 | Johnson | |
| 6,822,782 B2 | 11/2004 | Honeyman | |
| 6,865,010 B2 | 3/2005 | Duthaler | |
| 7,158,283 B2 | 1/2007 | Kawai | |
| 7,230,750 B2 | 6/2007 | Whitesides | |
| 7,319,554 B1 * | 1/2008 | Abe et al. | 359/296 |
| 7,411,720 B2 | 8/2008 | Honeyman | |
| 2004/0048197 A1 * | 3/2004 | Sabnis et al. | 430/286.1 |
| 2005/0168799 A1 * | 8/2005 | Whitesides et al. | 359/296 |
| 2005/0228099 A1 * | 10/2005 | Bringley et al. | 524/430 |
| 2005/0267252 A1 * | 12/2005 | Minami | 524/556 |
| 2006/0159838 A1 | 7/2006 | Kowalski | |
| 2010/0245981 A1 * | 9/2010 | Yeo et al. | 359/296 |

FOREIGN PATENT DOCUMENTS

| | | |
|---|---|---|
| JP | 55003411 | 1/1980 |
| JP | 2000169780 | 6/2000 |
| WO | 2006130144 | 12/2006 |
| WO | 2010050618 | 5/2010 |

OTHER PUBLICATIONS

Y. T. Wang et al., Electrophoretic ink using urea-formaldehyde microspheres, Journal of Microencapsulation, Nov. 2006; 23(7): 762-768.

* cited by examiner

*Primary Examiner* — Bijan Ahvazi
(74) *Attorney, Agent, or Firm* — HP Legal Department

(57) ABSTRACT

A pigment-based ink comprises: a non-polar carrier fluid; and pigment particles suspended in the non-polar carrier fluid. The pigment particles are coated with a metal oxide that is modified with at least one silane coupling agent to introduce functional groups, steric stabilizers or both. A combination of an electronic display and an electronic ink is provided, as is a method for modifying the pigment particles.

14 Claims, 5 Drawing Sheets

PIGMENT-BASED INK

BACKGROUND ART

The present disclosure relates generally to pigment-based inks.

Electronic inks are commonly used in electronic displays. Such electronic inks often include charged colorant particles that, in response to an applied electric field, rearrange within a viewing area of the display to produce desired images. This effect is known as electrophoresis, or more broadly electrokinetics.

Electronic inks are useful as a medium to low power reflective types of displays. Conventional electrophoretic displays feature either black and white states (by exchanging white and black charged colorant particles at the top of the display cell) or white and colored states (by moving white colorant particles in a dyed fluid up and down electrophoretically). These conventional electrophoretic displays cannot provide a clear state and cannot be easily extended to provide full-color displays with bright colors. There remain, however, technical challenges in identifying ink components that can stably operate in the electrophoretic/electrokinetic regime. Further, electronic paper utilizing electromigration of particles often exhibits relatively short lifetimes. Degradation may be observed in the form of decreased contrast with a very low number of cycling of the light/dark state or decreased contrast with short time being held at the light state.

BEST MODES FOR CARRYING OUT THE INVENTION

Figure 1A:
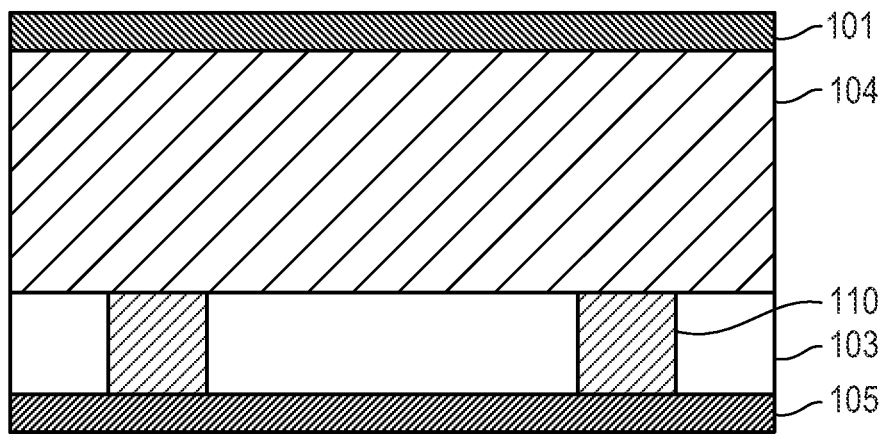
FIGS. 1A and 1B depict cross-sectional views of a dark state and a clear state of the electro-optical display used in multiple examples.

Aspects of the present invention were developed in relation to electronic inks, but the specification and claims are not so limited.

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

As used herein, the term "grayscale" applies to both black and white images and monochromatic color images. Grayscale refers to an image including different shades of a single color produced by controlling the density of the single color within a given area of a display.

As used herein, the term "over" is not limited to any particular orientation and can include above, below, next to, adjacent to, and/or on. In addition, the term "over" can encompass intervening components between a first component and a second component where the first component is "over" the second component.

As used herein, the term "adjacent" is not limited to any particular orientation and can include above, below, next to, and/or on. In addition, the term "adjacent" can encompass intervening components between a first component and a second component where the first component is "adjacent" to the second component.

As used herein, the term "electronic ink display" is an information display that forms visible images using one or more of electrophoresis, electro-convection, electro-osmosis, electrochemical interactions, and/or other electrokinetic phenomena.

The article 'a' and 'an' as used in the claims herein means one or more.

Examples provide bi-state and/or tri-state electrophoretic display cells (or elements) having a three-dimensional architecture for compacting charged colorant particles within the display cells. A bi-state display cell having a dark state and a clear state is provided by an electronic ink with charged colorant particles in an optically transparent fluid. A clear state is achieved when the colorant particles are compacted and a colored state is achieved when the colorant particles are spread. An electronic ink with charged white particles in a colored fluid enables white and spot-color states, with the color of the colored state depending on the color of the fluid. The ink fluid is colored by a dye, nanoparticle colorants, pigments, or other suitable colorants. A white state is achieved when the white particles are spread and a colored state is achieved when the white particles are compacted. By combining the white particles in the colored fluid with a colored resin on the back of the display cell, a tri-state display cell is provided.

A purely electrophoretic display cell includes a three-dimensional architecture to provide a clear optical state. In this architecture, the geometrical shape of the display cell has narrowing portions in which electrophoretically translated colorant particles compact in response to appropriate bias conditions applied to driving electrodes on opposite sides of the display cell. The three-dimensional structure of the display cell introduces additional control of electrophoretically moving colorant particles. As a result, desired functionalities can be achieved with a relatively well developed and more stable electrophoretic ink. The driving electrodes are passivated with a dielectric layer, thus eliminating the possibility of electrochemical interactions through the driving electrodes from direct contact with the electrophoretic ink. In other examples, the driving electrodes are not passivated, thus allowing electrochemical interactions with the electrophoretic ink.

Figure 1B:
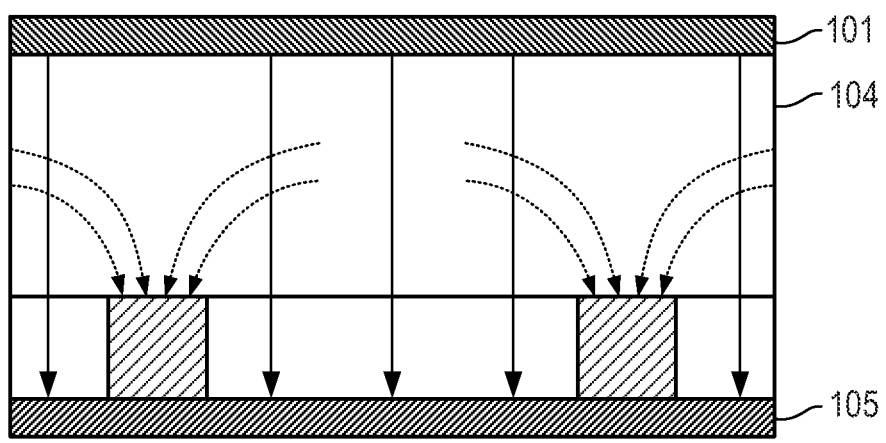

FIG. 1A illustrates the display element in a dark state. FIG. 1B illustrates the display element in a clear state. Both figures use a transparent top electrode 101 as a "source" from which colorant particles enter the display element and another electrode 105 as a "sink" to which colorant particles flow. While the "source" electrode 101 of FIGS. 1A-1B is subsequently described as being transparent, the present embodiments are not required to have both electrodes as being transparent. One of either the "source" or the "sink" electrodes can be comprised of an opaque material.

The example of FIGS. 1A-1B is comprised of a "sink" electrode 105 formed on a substrate that, in one example, is coated with a continuous film of transparent conductive material. The transparent conductive material can include carbon nanotube layers, a transparent conducting oxide such as ITO (indium tin oxide), or a transparent conducting polymer such as PEDOT (poly-3,4-ethylenedioxythiophene). Alternate examples may use other materials that provide suitable conductivity and transparency for the device.

In an alternate example, the substrate can be coated with or comprised of a reflective material. In yet another example, the substrate can be an opaque material. In still another example, a light scatterer can be formed on the dielectric material.

A layer of transparent electrically insulating material 103 (i.e., dielectric) is deposited on the bottom electrode 105. The dielectric 103 is patterned to create recessed regions 110 in the dielectric 103 on the electrode 105.

The recessed regions can be manufactured by many different processes. These processes include embossing or imprinting with a master or stamp or etching of the dielectric layer 103. The recessed regions can be any size and/or shape.

In a different example, electrodes are only defined within the recessed regions of the dielectric layer. In such an example, the dielectric layer 103 is deposited and patterned on top of the insulating substrate first, and then the electrodes are formed inside the recess areas, for example by electroless deposition or by another suitable method. In an alternate example, the bottom electrode layer 105 is patterned into a collection of electrodes first, and then the dielectric layer 103 is deposited and the recess areas 110 are formed directly on top of the electrodes. The alignment for the latter operation can be achieved for example by photolithography.

The display element is completed by the formation of the transparent "source" electrode 101 that is formed a fixed distance apart from the dielectric layer 103 to thus form the display volume 104 that holds the carrier fluid. The "source" electrode 101 is held at the fixed distance by a network of mechanical stops (not shown) that may include posts, walls, and/or spacer beads. The mechanical stops may be formed by embossing, imprinting, molding, or photolithography of materials such as photoresists or embossing resins.

The carrier fluid employed in the inks used in the display element of FIGS. 1A-1B can include either polar fluids (e.g., water) or non-polar fluids (e.g., dodecane). Additionally, anisotropic fluids such as liquid crystal can be used. The fluid may include surfactants such as salts, charging agents, stabilizers, and dispersants. In one example, the surfactants provide a fluid that is an electrolyte that is able to sustain current by ionic mass transport.

The colorant particles in the carrier fluid are comprised of a charged material in the case of an electro-convective display. The colorant particle material should be able to hold a stable charge indefinitely so that repeated operation of the element does not affect the charge on the colorant particles. However, colorant particle materials having a finite ability to hold a stable charge can be used in accordance with the various examples while they maintain their charge.

In the dark state of the element, illustrated in FIG. 1A, the colorant particles are relatively uniformly distributed across the element's display volume 104 to absorb the incident light and create the dark optical appearance. The colorant particles may or may not be prevented from occupying one or more recess regions 110 in the dielectric layer 103.

To switch the element, an electric potential difference V is applied between the two electrodes 101, 105. This results in a clearing of the main aperture of the element as illustrated in FIG. 1B. Transverse solid lines of arrows indicate electric field lines and arrows leading into the recess regions indicate the flow of colorant particles following the electrostatic and convective flows. Having the colorant particles compacted in the recess regions is subsequently referred to as the clear (or light) state.

Even though the electrical potential difference causes the ionic and convective flow of the fluid, the charged colorant particles do not follow the electric field lines (the solid lines). The charged colorant particles actually follow the lines of convective flow as shown by the dashed lines of FIG. 1B. In this regard, the flow is not totally electrophoretic. Under purely electrophoretic flow, the colorant particles would be pulled down vertically until stopped at the top boundary of the dielectric but would not generally move in-plane.

In one example, the convective flow is induced by ionic mass transport in the carrier fluid and charge transfer between the carrier fluid and the electrodes. The charge transfer can occur when the carrier fluid is coupled to the electrodes either through direct contact with the electrodes or separated from the electrodes by an intermediate layer comprising one or more materials. In the latter case, charge transfer is facilitated by the internal electrical conductivity of the intermediate layer, either volumetric or via pinholes and other defects.

In an alternate example, the convective flow is a transient effect caused by the ionic mass transport in the carrier fluid, but without charge transfer between the carrier fluid and the electrode. In this case, the convective flow proceeds for a finite amount of time and facilitates the compaction of the colorant particles in the recess areas. After that the colorant particles are contained in the recesses by electrostatic forces generated by a coupling with the electrodes.

To switch the display element from the clear state to the dark state, the polarity of the voltage is reversed. This induces convective flow in the opposite direction and the colorant particles are no longer electrically contained in the recesses. As a result, the colorant particles are mass transported to the display volume and then spread relatively evenly throughout the display volume.

Convection within the display element can also be induced by other means. For example, convective flow can be induced by an electrokinetic means, a mechanical means (e.g., mechanical pistons), temperature gradients (e.g., heating of the sources and sinks, focused radiation), chemical potential gradients, as well as other means.

The depth of the recesses in the dielectric layer can be defined by the following equation:

$$h_m = \frac{L}{L_m - L} \cdot \frac{d}{1 - P}$$

where L is the colorant particle load by volume, $L_m$ is the maximum closed packed colorant particle load by volume, d is the thickness of the main element display volume and P is the aperture ratio defined by $1-A_0/A$. The quantity A is the area of the element display volume while $A_0$ is the recess area. The total area of the defined recess regions of the first or second electrodes is sufficiently less than the area of the display element to provide optical contrast between the collected particle state and the spread particle state.

In one example, the total area of the defined recess regions of the first or second electrodes is between 1% and 10% of the area of the display element, in order to maximize the optical contrast between the clear and the dark states. However, the present examples are not limited to any pre-defined aperture ratio. For example, an alternate approach might have a total area of the recessed regions being between 10% and 20% of the area of the display element. Still another example might have a total area of the recessed regions being between 20% and 50% of the area of the display element. Other examples might have a total area of the recessed regions being >50% of the area of the display element for examples where low optical contrast is required.

In additional examples, a grey scale of the display element can be controlled by one of: an aperture ratio, a density of recess regions that are electrically active, or a depth of recess regions that are electrically active. These approaches enable geometrical control over how the colorant particles are spread throughout the display volume and collected in the recess regions through variations in the sizes of the recess regions, the spacing between the recess regions, and the depth of the recess regions.

In one example, the aperture ratio P and the recess depth can be adjusted to maximize the optical contrast between the clear and the dark states.

The structure depicted in FIGS. 1A-1B is but one example of many possible configurations of an electronic ink display. The electronic inks disclosed herein are intended for use in all such electronic ink displays.

In accordance with the teachings herein, electronic inks may be prepared from pigment particles that have been modified with silane coupling agents (SCAs) to introduce functional groups and/or steric stabilizers to improve the lifetime of electronic media. More particularly, the pigment surfaces may be modified with SCAs to include acidic or basic groups for charging and/or steric stabilizers for suspending the particles in an electronic ink vehicle.

Silane coupling agents may comprise compounds of the formula

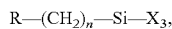

where R is a functional group, $—(CH_2)_n—$ is a linker group, Si is silicon, and X is a reactive group towards hydroxyl groups on the pigment surface. R may be an acidic or basic functional group; alternatively, R may be a bulky group to provide steric hindrance. X may be an alkoxy, hydroxyl group or chlorine.

Examples of SCAs having acidic or basic functional groups useful in the practice of the various examples of the invention include, but are not limited to, aminopropyl triethoxy silane (A1100), triethoxysilylpropylmaleamic acid (TMA), 3-(trihydroxysilyl)-1-propane sulfonic acid (TSA), N-3-[amino(polypropylenoxy)]-aminopropyltrimethoxysilane, N-(hydroxyethyl)-N-methylaminopropyltrimethoxysilane, diethylaminomethyltriethoxysilane, (N,N-diethyl-3-amino-propyl)trimethoxysilane, 2-(4-pyridylethyl)triethoxysilane, N-(3-triethoxysilylpropyl)-4,5-dihydroimidazole, 3-trihydroxysilylpropylmethylphosphonic acid, N-(trimethoxysilylpropyl)ethylenediamine triacetic acid, and the salt forms thereof, such as Ca and Na as counter ions. Examples of SCAs having bulky R group(s) include, but are not limited to, n-(trimethoxysilylpropyl)ethylenediamine triacetic acid trisodium (TETAA), n-octadecyl trimethoxysilane (ODTS), and dimethyloctadecyl[3-(trimethoxysilyl)propyl]ammonium chloride (DMOTPAC), adamantylethyltrichlorosilane, 2-((bicycloheptyl)trichlorosilane, t-butylisopropyldimethoxysilane, 13-(chlorodimethylsilylmethyl)heptacosane, 11-(cholorodimethylsilylmethyl)tricosane, n-decyltrichlorosilane, n-decyltriethoxysilane, cyclohexylmethyldimethoxysilane, dicyclohexyldichlorosilane, (3,3-dimethylbutyl)dimethylchlorosilane, di-n-octyldichlorosilane, (di-n-octylmethylsilyl)ethyldimethylchlorosilane, (di-n-octylmethylsilyl)ethyltrichlorosilane, docosyltrichlorosilane, eicosyltrichlorosilane, hexadecyltriethoxysilane, isooctyltrimethoxysilane, n-octyldiisopropylchlorosilane Silane coupling agents have been used in modifying surfaces of silicon wafers for enhanced adhesion and reduced delamination with subsequent organic layers. However, applying this chemistry to $SiO_2$-coated particles, such as carbon black (CB) and titanium dioxide and other pigments, is very challenging since the chemistry involves equilibrium and competing side reactions and the particles are not readily separated from the solutions containing the reactants. In addition, the resulting particles need to be non-aggregated to be formulated into electronic inks.

The process taught herein differs from the silicon wafer treatment by including a reflux step, a centrifugation step, and a series of steps involving sequential washing and separation using increasingly non-polar solvents.

An example of the process is as follows:
The pigment to be treated may be mixed with at least one silane coupling agent in a solvent, such as water and alcohol, and heated to reflux. Reflux may be performed for about one hour, as an example.

Once cooled, the liquid may be removed, such as by centrifugation.

The treated pigment may be sequentially washed and separated by centrifugation with successively less polar solvents, such as starting with deionized (DI) water, then an alcohol that is soluble in water, and finally the carrier fluid to be used in constituting the treated pigment particles in the electronic ink. An example of the alcohol is anhydrous iso-propyl alcohol. An example of the carrier fluid is ISOPAR. ISOPAR is the brand name for several grades of high-purity isoparaffinic solvents with narrow boiling ranges, available from Exxon Mobile Corporation, Houston, Tex.

In the case of Ca or Na is the counter ion, the mixture in DI water is titrated with $Ca(OH)_2$ or NaOH, respectively, to pH of 8.5 and followed by sequentially washing and centrifugation as described above.

Figure 2:
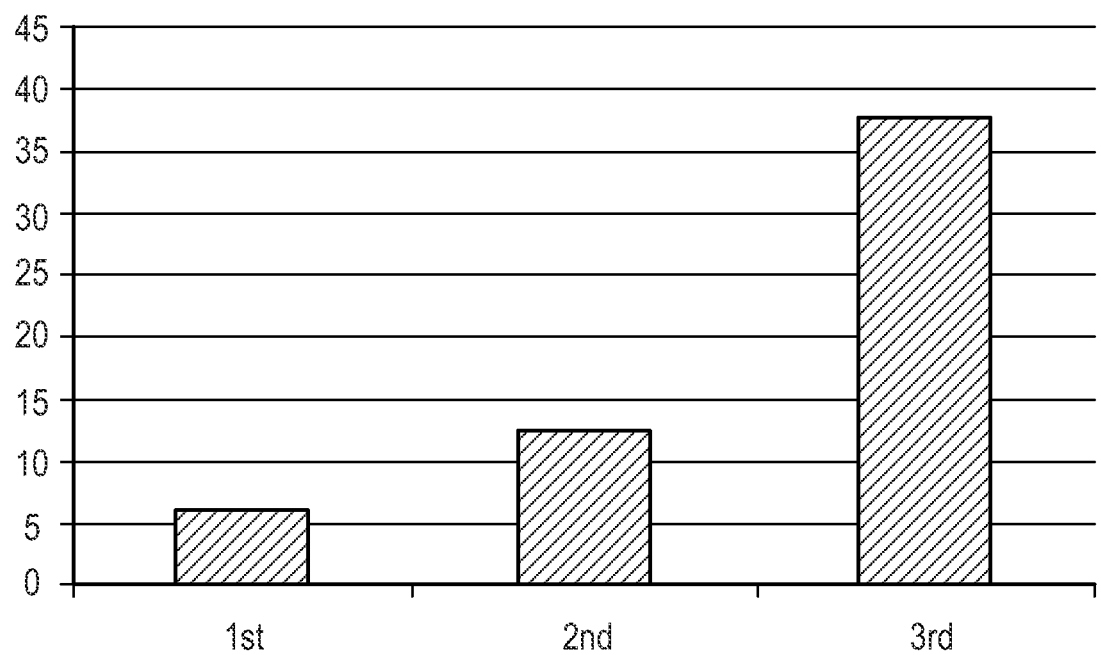
FIG. 2, on coordinates of nominal contrast and trials, is a graph depicting the nominal contrast of carbon black (CB) inks that are modified with (3-(trihydroxysilyl)-1-propane sulfonic acid (TSA) for three process trials of TSA treatment, in accordance with an example.

Initial attempts using processes known in the prior art to modifying silica-coated pigments were not successful. Subsequent modifications to the processes yielded progressively improved device performance. FIG. 2 depicts the switching performance of electronic inks employing carbon black pigment processed in different ways. Nominal contrast is defined as the difference between measured light intensity at light state and that at dark state.

The first process trial ("1st") shows the nominal contrast of treating carbon black by employing the conventional silicon wafer treatment, namely, soaking the pigment particles in a water/alcohol solution with the silane coupling agent TSA, centrifuging and decanting off the pigment particles, and then baking the pigment particles.

The second process trial ("2nd") shows the nominal contrast of treating carbon black by refluxing the pigment particles in a water/alcohol solution with the silane coupling agent TSA and then freeze drying them.

The third process trial ("3rd") shows the nominal contrast of treating carbon black by refluxing the pigment particles in a water/alcohol solution with the silane coupling agent TSA, cooling the mixture and centrifuging to remove the liquid, washing and separating by centrifugation with deionized (DI) water, anhydrous iso-propyl alcohol, and ISOPAR®. In all cases cited, the alcohol in the water/alcohol solution comprised ethyl alcohol.

It is seen that the first two trials had very low nominal contrast. Only the third trial yielded significant nominal contrast.

Figure 3:
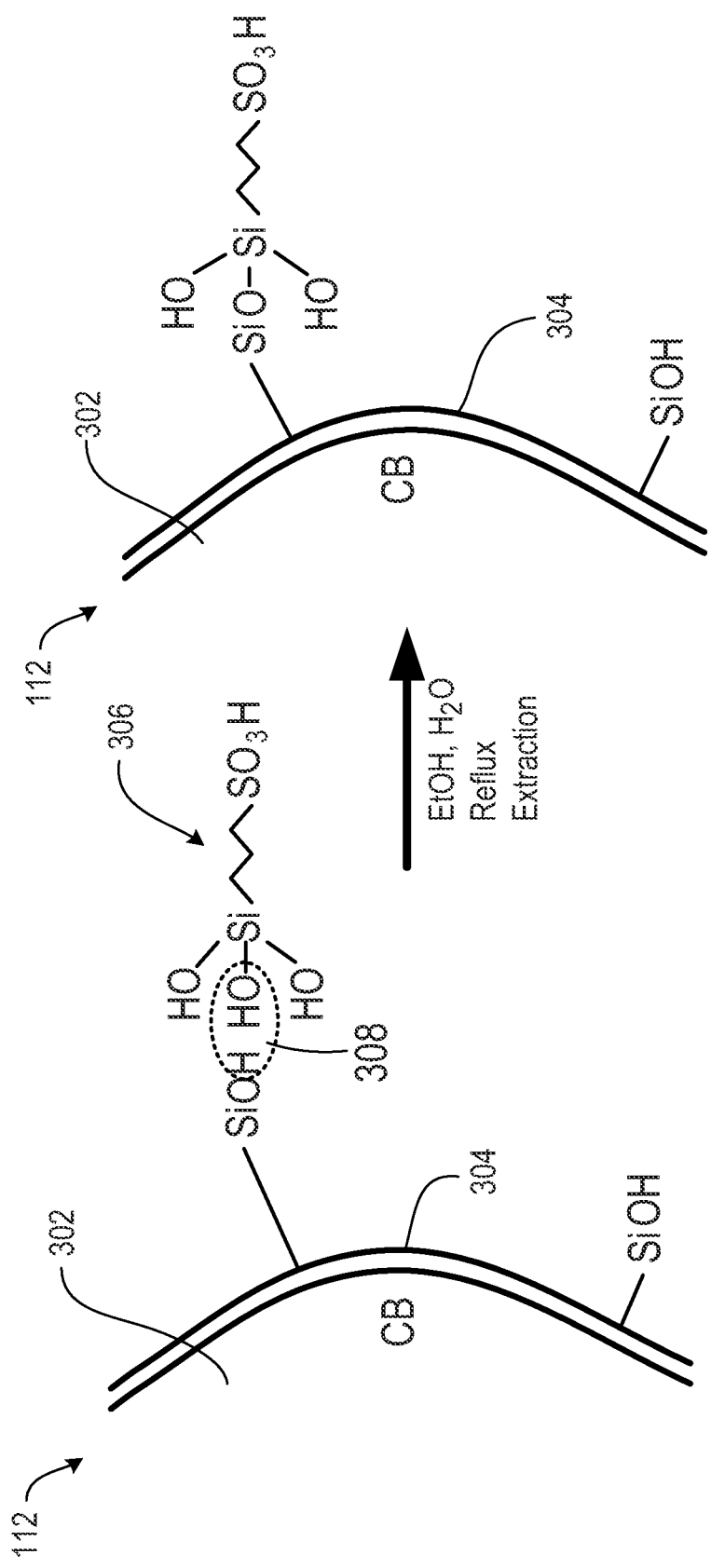
FIG. 3 is a schematic representation showing the coupling reaction of TSA with a $SiO_2$-coated CB particle, in accordance with an example.

One example of a chemical reaction for the coupling reaction of TSA with $SiO_2$-coated carbon black particles 112 is shown in FIG. 3. A carbon black (CB) pigment particle 302 (a portion is shown) having a coating 304 of $SiO_2$ is provided. The coating 304, which can be any metal oxide, has free hydroxyl (—OH) groups dangling from the surface thereof. In this example, the coating 304 is silica.

The pigment particle 112 may be coated with a thin metal oxide coating 304 prior to surface functionalization. This coating 304 may be a $SiO_2$ coating, a $TiO_2$ coating, an $HfO_2$ coating, an $Al_2O_3$ coating, a $ZrO_2$ coating, a ZnO coating, a MgO coating, a CaO coating, a $B_2O_3$ coating, and/or the like. The thickness of such coating 304 may range from about 1 nm to about 100 nm. Any known process for applying the coating 304 may be used, some of which are described in U.S. Pat. No. 3,895,956, U.S. Pat. No. 4,002,590, U.S. Pat. No. 4,117,197, U.S. Pat. No. 4,153,591, and EP 0247910.

Trihydroxysilyl-1-propane sulfonic acid, represented schematically at 306, reacts with the free hydroxyl groups in the presence of ethyl alcohol (EtOH) and water under reflux and dehydration to produce the TSA molecule coupled to an O moiety; water ($H_2O$) 308 is a by-product of the reaction. Such reactions occur all over the surface of each pigment.

Shown in Table I below are ink formulation examples using some of the SCA treated $CB/SiO_2$ pigments along with a control ink.

TABLE I

Ink Formulation Examples

| Composition | Control | TSA | TSA-Ca | TSA-Ca/ODTS |
|---|---|---|---|---|
| Pigment type | $CB/SiO_2$ | TSA treated $CB/SiO_2$ | TSA-Ca treated $CB/SiO_2$ | TSA-Ca/ODTS treated $CB/SiO_2$ |
| Pigment Concentration (wt %) | 5 | 5 | 5 | 5 |
| Polymeric dispersant (wt %) | 5 | 5 | 5 | 5 |
| Polymeric additive 1 (wt %) | 0.5 | 0.5 | 0.5 | 0.5 |
| Small molecule additive 2 (wt %) | 2 | 0 | 0 | 0 |
| ISOPAR | remainder | remainder | remainder | remainder |

Figure 4:
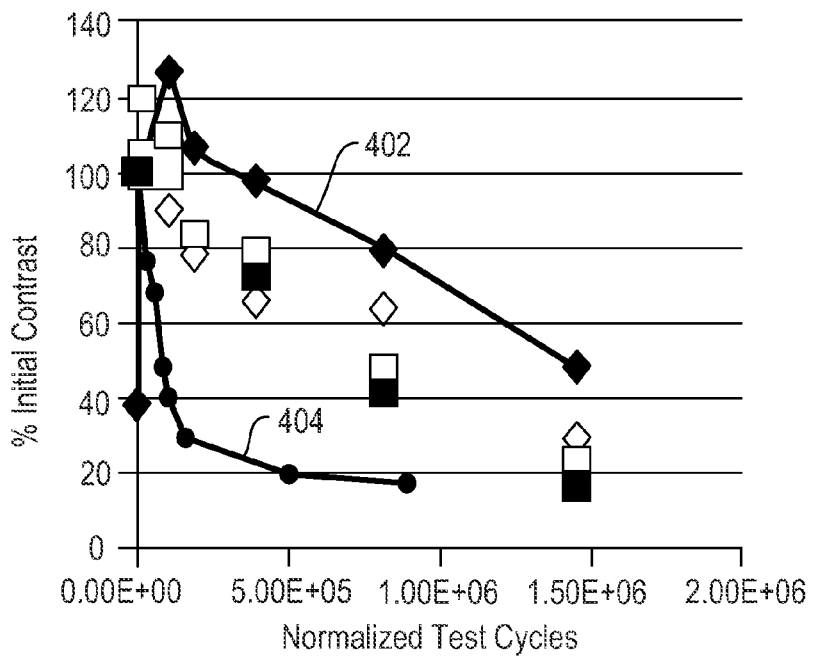
FIG. 4, on coordinates of percent initial contrast and normalized test cycles, is a plot depicting contrast as a function of the normalized test cycles, in accordance with an example.
Figure 5:
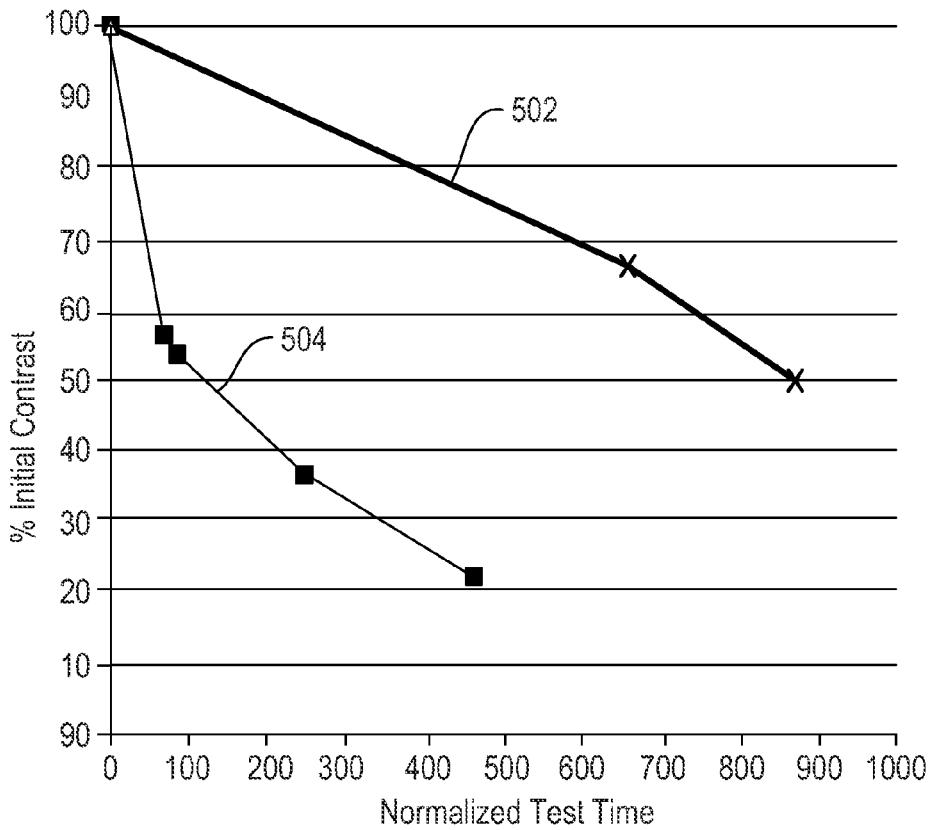
FIG. 5, on coordinates of percent initial contrast and normalized test time, is a plot depicting the life test (held at the light state) of black ink using a TSA-Ca modified CB compared to a control, in accordance with an example.

Examples of improved device life using TSA and TSA-Ca modified $SiO_2$-coated CB particles are shown in FIGS. 4 and 5. Display elements, such as shown in FIG. 1, were constructed using a resin as the dielectric layer 103. The resin was a UV-curable resin, which in some examples may be polymers of acrylates/methacrylates ("PAM"), or which in other examples may be polymers of epoxides ("PE"). The electrodes may be composed of transparent conductors, such as ITO, carbon nanotubes, Ag nanowire, Ni nanowire, Au, Pt, etc.

FIG. 4 is a plot of the percent initial contrast as a function of the normalized test cycles for various TSA and TSA-Ca modified carbon black pigments, along with a control (as in Table I). Electronic inks that include the treated CB pigments were placed in the display elements such as shown in FIGS. 1A-1B. All inks comprised the carbon black pigment, a polymeric hyperdispersant, carrier fluid ISOPAR, and polyisobutylene succinimide charge director.

In FIG. 4, the notation "E+05" means $10^5$. Thus, "5.00E+05"=$5 \times 10^5$. The open diamonds (◇) are based on TSA-PAM. The filled squares (■) are based on TSA-PE. The open squares (□) are based on TSA-Ca-PE. Curve 402 based on TSA-Ca-PAM. Curve 404 is based on CB-$SiO_2$-PAM (control). Specifically, the control ink (Curve 404) included carbon black particles coated with $SiO_2$.

FIG. 5 is a plot of the percent initial contrast as a function of normalized test time for cells held in the light state of black ink using TSA-Ca modified CB versus control. Curve 502 is based on the ink formula in Table 1 in a display cell constructed of polymers of epoxides (PE). Curve 504 is the control ink in the same cell construction as the test ink.

In both Figures, compared with the control ink (non-modified $SiO_2$ coated CB), TSA and TSA-Ca modified CB improved the device life significantly, while either switching (FIG. 4) or held at a light state (FIG. 5).

Figure 6A:
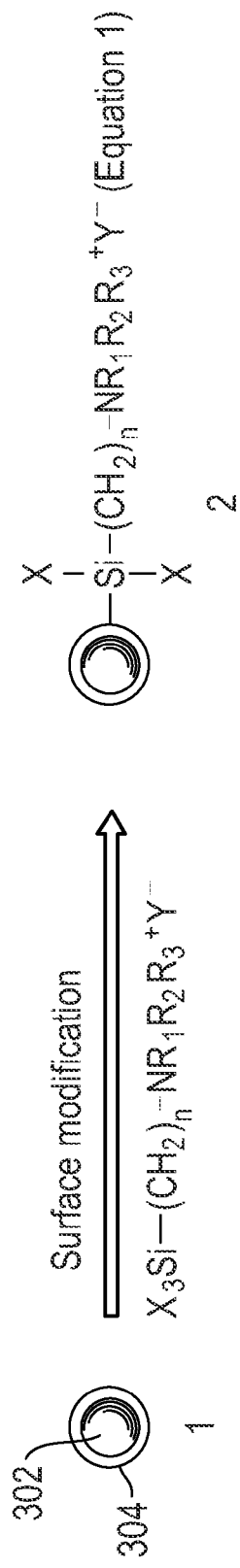
FIG. 6A depicts a reaction for introducing covalently bonded ammonium salts onto silica-coated pigment particles, in accordance with an example.

FIG. 6A is a reaction scheme showing a general example of introducing covalently bonded ammonium salts onto silica-coated pigment particles, employing a silane coupling agent having a basic functional group. In the compound shown, $R_1$, $R_2$, and $R_3$ can be the same or independently different. In some examples, $R_1$, $R_2$, and $R_3$ may be alkyl groups, either linear or branched. In some examples, at least one of $R_1$, $R_2$, and $R_3$ may be an aryl group. This reaction may be used to introduce a basic group onto the surface of the oxide-coated pigment particles, and shows a variation of the reaction depicted in FIG. 3, in which an acidic group is introduced onto the surface.

Figure 6B:
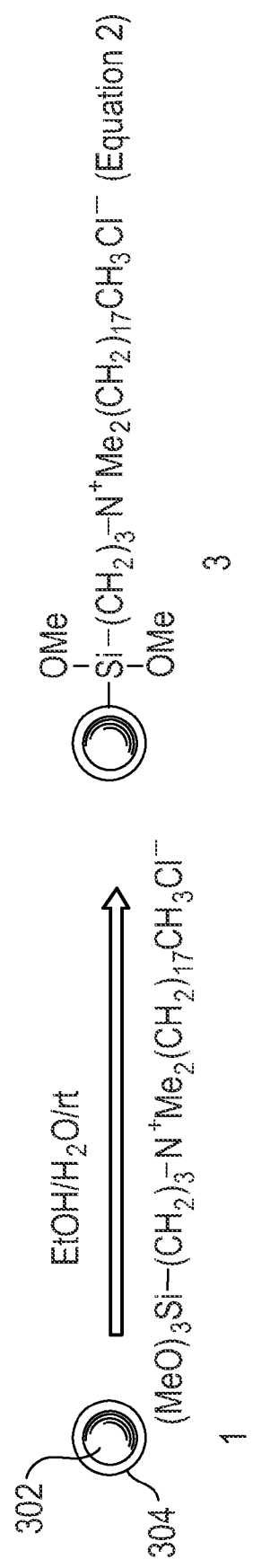
FIG. 6B depicts a reaction for introducing covalently bonded steric stabilizers onto silica-coated pigment particles, in accordance with an example.

Another example of the type of surface modification disclosed herein is to introduce covalently bonded steric stabilizers. FIG. 6B is also a reaction scheme, showing one of many examples of introducing a covalently bonded steric stabilizer by treating silica-coated pigment particles with dimethyloctadecyl[3-(trimethoxysilyl)propyl]ammonium chloride.

An example of using both a functional (TSA-Ca) SCA and a steric stabilizer (ODTS) SCA was performed. A life test was run comparing black ink using TSA-Ca and ODTS modified CB inks with varying amounts of ODTS versus a control (non-modified $SiO_2$-coated CB). The device life is significantly improved as compared with the control. In addition, higher loading of ODTS (2ODTS) retained more of the initial contrast than just TSA-Ca alone.

In each of the foregoing examples, the ink employing the pigment particles treated in accordance with the teaching herein was found to be improved over a control ink that employed pigment particles not so treated.

Turning now to electronic inks that employ the surface-modified pigments discussed above, examples of such electronic inks generally include a non-polar carrier fluid (i.e., a fluid having a low dielectric constant k such as, e.g., less than about 20, or, in some cases, less than about 2). Such fluids tend to reduce leakages of electric current when driving the display, as well as increase the electric field present in the fluid. As used herein, the "carrier fluid" is a fluid or medium that fills up a viewing area defined in an electronic ink display and is generally configured as a vehicle to carry colorant particles therein. In response to a sufficient electric potential or field applied to the colorant particles while driving electrodes of the display, the colorant particles tend to move and/or rotate to various spots within the viewing area in order to produce a desired visible effect in the display cell to display an image. The non-polar carrier fluid includes, for example, one or more non-polar solvents selected from hydrocarbons, halogenated or partially halogenated hydrocarbons, and/or siloxanes. Some specific examples of non-polar solvents include perchloroethylene, cyclohexane, dodecane, mineral oil, isoparaffinic fluids, cyclopentasiloxane, cyclohexasiloxane, and combinations thereof.

The colorant particles are dispersed in the carrier fluid. As used herein, the term "colorant particles" refers to particles that produce a color. Some non-limiting examples of suitable colorant particles include the surface-modified pigment particles described above. In a non-limiting example, the colorant particles are selected from pigment particles that are self-dispersible in the non-polar carrier fluid. It is to be understood, however, that non-dispersible pigment particles may otherwise be used so long as the electronic ink includes one or more suitable dispersants. Such dispersants include hyperdispersants such as those of the SOLSPERSE® series manufactured by Lubrizol Corp., Wickliffe, Ohio (e.g., SOLSPERSE® 3000, SOLSPERSE® 8000, SOLSPERSE® 9000, SOLSPERSE® 11200, SOLSPERSE® 13840, SOLSPERSE® 16000, SOLSPERSE® 17000, SOLSPERSE® 18000, SOLSPERSE® 19000, SOLSPERSE® 21000, and SOLSPERSE® 27000); various dispersants manufactured by BYK-chemie, Gmbh, Germany, (e.g., DISPERBYK® 110, DISPERBYK® 163, DISPERBYK® 170, and DISPERBYK® 180); various dispersants manufactured by Evonik Goldschmidt GMBH LLC, Germany, (e.g., TEGO® 630, TEGO® 650, TEGO® 651, TEGO® 655, TEGO® 685, and TEGO® 1000); and various dispersants manufactured by Sigma-Aldrich, St. Louis, Mo., (e.g., SPAN® 20, SPAN® 60, SPAN® 80, and SPAN® 85).

In some examples, the concentration of pigment in the electronic ink ranges from about 0.5 to 20 percent by weight (wt %). In other examples, the concentration of the pigment ranges from about 1 to 10 wt %. In some examples, the concentration of dispersant in the electronic ink ranges from about 0.5 to 20 percent by weight (wt %). In other examples, the concentration of the pigment ranges from about 1 to 10 wt %. The carrier fluid makes up the balance of the ink.

There is commonly a charge director employed in electronic inks. As used herein, the term "charge director" refers to a material that, when used, facilitates charging of the colorant particles. In an example, the charge director is basic and reacts with the acid-modified colorant particle 112 to negatively charge the particle. In other words, the charging of the particle 112 is accomplished via an acid-base reaction between the charge director and the acid-modified particle surface. It is to be understood that the charge director may also be used in the electronic ink to prevent undesirable aggregation of the colorant in the carrier fluid. In other cases, the charge director is acidic and reacts with the base-modified colorant particle to positively charge the particle. Again, the charging of the particle 112 is accomplished via an acid-base reaction between the charge director and the base-modified particle surface.

The charge director may be selected from small molecules or polymers that are capable of forming reverse micelles in the non-polar carrier fluid. Such charge directors are generally colorless and tend to be dispersible or soluble in the carrier fluid.

In a non-limiting example, the charge director is selected from a neutral and non-dissociable monomer or polymer such as, e.g., a polyisobutylene succinimide amine, which has a molecular structure as follows:

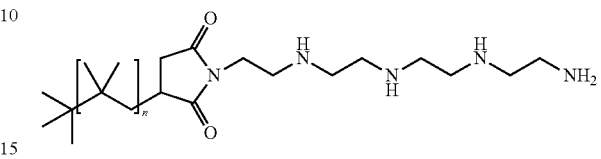

where n is selected from a whole number ranging from 15 to 100.

Another example of the charge director includes an ionizable molecule that is capable of disassociating to form charges. Non-limiting examples of such charge directors include sodium di-2-ethylhexylsulfosuccinate and dioctyl sulfosuccinate. The molecular structure of dioctyl sulfosuccinate is as follows:

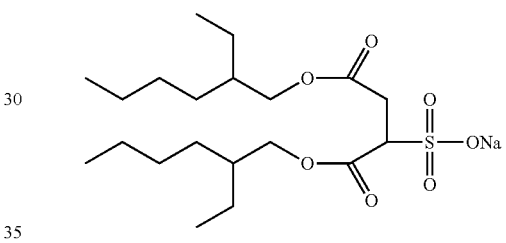

Yet another example of the charge director includes a zwitterion charge director such as, e.g., Lecithin. The molecular structure of Lecithin is as shown as follows:

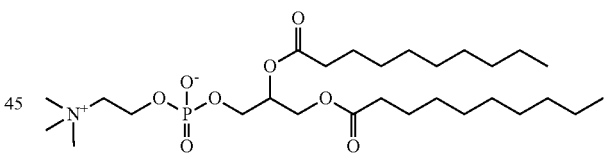

Examples of acidic charge directors may include any polymeric dispersant that has an acidic functional group as a polar head. An example of one such acidic charge director is poly(hydroxyl)aliphatic acid.

The pigment particles are selected from organic or inorganic pigments, and have an average particle size ranging from about 1 nm to about 10 μm. In some instances, the average particle size ranges from about 50 nm to about 1 μm. Such organic or inorganic pigment particles may be selected from black pigment particles, yellow pigment particles, magenta pigment particles, red pigment particles, violet pigments, cyan pigment particles, blue pigment particles, green pigment particles, orange pigment particles, brown pigment particles, and white pigment particles. Although the description earlier was given in terms of surface-modified titania (white) and surface-modified carbon black (black), and more specifically for carbon black, the surface modification reactions disclosed herein work for most, if not all, pigments of whatever color. In some instances, the organic or inorganic pigment particles may include spot-color pigment particles, which are formed from a combination of a predefined ratio of two or more primary color pigment particles.

A non-limiting example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® L, MONARCH® 700, MONARCH® 800, MONARCH® 880, MONARCH® 900, MONARCH® 1000, MONARCH® 1100, MONARCH® 1300, and MONARCH® 1400); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). A non-limiting example of an organic black pigment includes aniline black, such as C.I. Pigment Black 1.

Non-limiting examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, and C.I. Pigment Yellow 180.

Non-limiting examples of suitable magenta or red or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), al. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Non-limiting examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Non-limiting examples of green organic pigments include C.I. Pigment Green 1, C.I. Pigment Green 2, C.I. Pigment Green, 4, C.I. Pigment Green 7, C.I. Pigment Green 8, C.I. Pigment Green 10, C.I. Pigment Green 36, and C.I. Pigment Green 45.

Non-limiting examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Non-limiting examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

As described above, pigments whose surfaces have been modified using a silane coupling agent to introduce acidic or basic groups for charging and steric stabilizers for suspending the pigments in an electronic ink vehicle may be added to a vehicle for use in electronic ink applications. Such surface modification improves the lifetime of electronic inks.

What is claimed is:
1. A pigment-based ink comprising
a non-polar carrier fluid; and
pigment particles suspended in the non-polar carrier fluid, the pigment particles coated with a metal oxide that is reacted with at least one silane coupling agent to covalently bond functional groups, steric stabilizers or both on the metal oxide coating, and wherein the at least one silane coupling agent is a compound of the formula;

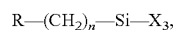

wherein R is an acidic functional group, —$(CH_2)_n$— is a linker group where n is an integer from 1 to 5, and X is a reactive group towards hydroxyl groups on the pigment surface and is selected from the group consisting of alkoxy, hydroxyl, and chlorine,
wherein the at least one silane coupling agent is selected from the group consisting of triethoxysilylpropyl-maleamic acid (TMA), 3-(trihydroxysilyl)-1-propane sulfonic acid (TSA), 3-trihydroxysilyl-propylmethylphosphonic acid, N-(trimethoxysilylpropyl)ethylenediamine triacetic acid, and the salt forms of the foregoing with Ca or Na as counter ions; and wherein the pigment particles are charged such that they follow connective flow.

2. The ink of claim 1, wherein the non-polar carrier fluid is a non-polar solvent selected from the group consisting of hydrocarbons, halogenated or partially halogenated hydrocarbons, and siloxanes.

3. The ink of claim 2, wherein the non-polar solvent is selected from the group consisting of perchoroethylene, cyclohexane, dodecane, mineral oil, isoparaffinic fluids, cyclopentasiloxane, cyclohexasiloxane, and combinations thereof.

4. The ink of claim 1, wherein the at least one silane coupling agent is n-(trimethoxysilylpropyl)ethylenediamine triacetic acid trisodium (TETAA).

5. The ink of claim 1, wherein the metal oxide is selected from the group consisting of $SiO_2$, $TiO_2$, $HfO_2$, $Al_2O_3$, $ZrO_2$, ZnO, MgO, CaO, and $B_2O_3$.

6. The ink of claim 1, wherein the pigment particles have an average particle size ranging from about 1 nm to about 10 µm.

7. The ink of claim 1, wherein the pigment particles are selected from the group consisting of black pigment particles, yellow pigment particles, magenta pigment particles, red pigment particles, violet pigment particles, cyan pigment particles, blue pigment particles, green pigment particles, orange pigment particles, brown pigment particles, and white pigment particles.

8. An electronic display comprising
a first electrode;
a second electrode;
a display cell defined by a dielectric material between the first electrode and the second electrode, the display cell comprising an electronic ink;
wherein the electronic ink comprises: a non-polar carrier fluid; and pigment particles suspended in the non-polar carrier fluid, the pigment particles coated with a metal oxide that is reacted with silane coupling agents to covalently bond functional groups, steric stabilizers or both on the metal oxide coating, and wherein at least one silane coupling agent is a compound of the formula:

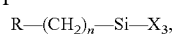
R—(CH$_2$)$_n$—Si—X$_3$, wherein R is an acidic functional group, —(CH$_2$)$_n$— is a linker group where n is an integer from 1 to 5, and X is a reactive group towards hydroxyl groups on the pigment surface and is selected from the group consisting of alkoxy, hydroxyl, and chlorine, wherein the at least one silane coupling agent is selected from the group consisting of triethoxysilylpropylmaleamic acid (TMA), 3-(trihydroxysilyl)-1-propane sulfonic acid (TSA), 3-trihydroxysilyl-propylmethylphosphonic acid, N-(trimethoxysilylpropyl)ethylenediamine triacetic acid, and the salt forms of the foregoing with Ca or Na as counter ions; and wherein the pigment particles are charged such that they follow connective flow.

9. The combination of claim 8, wherein the dielectric material comprises a UV-curable resin.

10. The combination of claim 8, wherein the non-polar carrier fluid is a non-polar solvent selected from the group consisting of hydrocarbons, halogenated or partially halogenated hydrocarbons, and siloxanes.

11. The combination of claim 10, wherein the non-polar solvent is selected from the group consisting of perchoroethylene, cyclohexane, dodecane, mineral oil, isoparaffinic fluids, cyclopentasiloxane, cyclohexasiloxane, and combinations thereof.

12. A process for treating a pigment for use in a pigment-based ink, the process comprising the step of:
providing a pigment coated with a metal oxide;
mixing the pigment with a silane coupling agent to form a mixture, the silane coupling agent including a functional group selected from the group consisting of acidic groups, basic groups, and steric stabilizers;
heating the mixture to reflux to react the silane coupling agent with the metal coating on the pigment;
cooling the mixture;
removing liquid to leave treated pigment;
washing the treated pigment in a succession of solvents having a polarity lower than that of a preceding solvent; and
recovering pigment having the at least one functional group covalently bonded on the metal oxide coating,
wherein the at least one silane coupling agent is a compound of the formula:

R—(CH$_2$)$_n$—Si—X$_3$, wherein R is an acidic functional group, —(CH$_2$)$_n$— is a linker group where n is an integer from 1 to 5, and X is a reactive group towards hydroxyl groups on the pigment surface and is selected from the group consisting of alkoxy, hydroxyl, and chlorine, wherein the at least one silane coupling agent is selected from the group consisting of triethoxysilylpropylmaleamic acid (TMA), 3-(trihydroxysilyl)-1-propane sulfonic acid (TSA), 3-trihydroxysilyl-propylmethylphosphonic acid, N-(trimethoxysilylpropyl)ethylenediamine triacetic acid, and the salt forms of the foregoing with Ca or Na as counter ions; and wherein the pigment particles are charged such that they follow connective flow.

13. The process of claim 12, wherein the treated pigment is washed sequentially in water, an alcohol that is soluble in water, and a non-polar carrier fluid.

14. The process of claim 13, wherein the non-polar carrier fluid is non-polar solvent is selected from the group consisting of hydrocarbons, halogenated or partially halogenated hydrocarbons, and siloxanes.

* * * * *